United States Patent [19]

Nisenson

[11] 3,903,400

[45] Sept. 2, 1975

[54] PARALLEL DIGITAL DATA PROCESSING SYSTEM

[75] Inventor: Peter Nisenson, Burlington, Mass.

[73] Assignee: Itek Corporation, Lexington, Mass.

[22] Filed: Nov. 14, 1973

[21] Appl. No.: 415,584

[52] U.S. Cl. .................. 235/152; 250/225; 350/150

[51] Int. Cl. .................. G06f 7/56

[58] Field of Search .................. 235/152, 156, 164; 340/347 DD; 250/201, 213 R, 216, 225, 567, 568; 350/150

[56] References Cited

UNITED STATES PATENTS

| | | | |
|---|---|---|---|
| 3,270,187 | 8/1966 | Fomenko | 235/152 |
| 3,305,669 | 2/1967 | Fan | 250/568 X |
| 3,354,451 | 11/1967 | Harris et al. | 250/225 X |
| 3,391,970 | 7/1968 | Sincerbox | 350/150 |
| 3,407,017 | 10/1968 | Fleisher et al. | 350/150 |
| 3,466,433 | 9/1969 | Duda et al. | 350/150 X |
| 3,517,206 | 6/1970 | Oliver | 250/225 |
| 3,566,130 | 2/1971 | Aldrich et al. | 250/213 |
| 3,631,253 | 12/1971 | Aldrich et al. | 250/225 X |
| 3,680,080 | 7/1972 | Maure | 235/152 X |
| 3,700,902 | 10/1972 | Buchan | 250/201 |

*Primary Examiner*—Malcolm A. Morrison
*Assistant Examiner*—Jerry Smith
*Attorney, Agent, or Firm*—Homer O. Blair; Robert L. Nathans; Gerald H. Glanzman

[57] ABSTRACT

Parallel digital data processing system for processing images or otherwise performing standard logical operations on digital data inputted thereto. The system according to a presently preferred embodiment comprises an optical circuit having a plurality of active electro-optic photosensitive storage devices coupled together by means of a variety of standard optical components as well as appropriate input, output and control subsystems such that essentially any type of logical operation such as ANDing, ORing, inverting and shifting can be performed on digital data applied to the circuit. The system utilizes incoherent imaging techniques, is capable of achieving accuracies approaching that of digital machines, and, at the same time, can handle immense amounts of data at high speeds making it especially suitable for applications requiring the processing of data in real or near real time.

22 Claims, 12 Drawing Figures

PARALLEL DIGITAL DATA PROCESSING SYSTEM

BACKGROUND OF THE INVENTION

1. Field of the Invention

The present invention relates generally to a parallel digital data processing system. More specifically, the present invention relates to a parallel optical digital data processing system utilizing incoherent imaging techniques which can effectively be utilized to process images or to otherwise perform standard logical operations in a rapid and highly efficient manner.

2. Description of the Prior Art

Conventional image processing systems can be broadly described as falling into two basic categories; digital and analog. In the more traditional analog systems, images are processed by being passed through one or more passive components such as lenses, filters, masks or the like selected and arranged to improve, adjust or combine the images in some desired manner. These systems have the basic advantage that they are able to process entire images at one time (i.e. process all image points in parallel), however, they also suffer from several inadequacies. For one thing, their precision and accuracy are quite limited due to their analog nature. Also, different components and different component arrangements are needed to perform different processing operations making a particular system useful for only a limited number of different applications. Furthermore, they are not very suitable for most real or near real time processing operations which is required in many fields such as aerial reconnaisance and the like.

Digital systems, on the other hand, utilizing the capabilities of modern digital computers provide greatly increased flexibility and are also capable of processing images in a much more precise and accurate manner. However, with these systems, it is also necessary to receive and process the image data in a serial fashion rather than in parallel. Accordingly, in a typical processing operation which might require resolving of an image into thousands or even millions of bits of separate image data, the processing of only a single image could require substantial time even for the fastest computers. Furthermore, in such processing systems it is also necessary to convert the image data into electrical signals that the computer can handle and to then reconstruct the image after processing. These conversions have the effect of degrading the quality of the image, and accordingly, can effect the accuracy of the processing operation.

As a result of the inherent inadequancies of the analog and digital systems, a substantial effort has gone into the development of processing apparatus which incorporate the advantageous features of both systems while avoiding their inadequacies. The result has been the development of several types of digital systems that can process images in parallel. One type, for example, comprises an electronic system in which an input image is received and digitized by a matrix of photodetectors which are, in turn, hard wired to logic circuits for each image point. Such a system, although capable of processing the data in parallel, does not provide a practical general purpose system because to provide generalized capabilities and to obtain high resolution would require an extremely costly and unwieldly system due to the limitations in state-of-the-art computer component technology. Accordingly, these systems are employed only in relatively simple and highly specialized applications. Also, such systems still require that the image data be converted into electrical signals for processing and then converted back to an image after processing.

Other types of systems in use utilize holographic techniques. Such systems besides requiring coherent light also suffer serious optical noise problems and are generally quite complex.

BRIEF SUMMARY OF THE PREFERRED EMBODIMENTS

In accordance with the present invention, a parallel digital processing system has been provided which overcomes many of the deficiencies of the prior art while, at the same time, enables essentially any type of logical operation to be performed on input data rapidly and with a relatively simple arrangement of components. In accordance with a presently preferred embodiment, the system includes a plurality of active data storage deviced coupled into a circuit together with appropriate controls for directing input data through the circuit in a desired manner to enable essentially any type of logical operation such as ANDing, ORing, inverting and shifting to be performed on the data to thereby enable essentially any type of processing operation to be carried out. In the presently most preferred embodiment, the storage devices comprise active electro-optic photosensitive devices coupled together into an optical circuit capable of processing data bearing radiation applied thereto. These devices may be any one of several types including liquid crystal devices, photoconductor ferroelectric devices or the like, however, the presently preferred electro-optic photosensitive device is one which has a photosensitive characteristic in which the conductance varies as a function of the incident radiation and an electro-optic characteristic of induced birefringence in which the birefringence varies as a function of an applied electric field. This device is described in detail in U.S. Pat. No. 3,517,206 to D. S. Oliver, and will also be described briefly hereinafter, and at present, best exhibits the properties that are needed to permit a highly versatile and practical system to be provided.

The system provided, as will be described in detail hereinafter incorporates most of the advantageous features of prior systems in that it processes images in parallel, it processes the images directly rather than first converting them to electrical signals, it achieves accuracies approaching that of digital machines, and it is capable of handling immense amounts of image data at great speeds. Also, the system is particularly suitable for processing data in near real time, requires no moving parts, utilizes incoherent imaging techniques and is extremely versatile.

DETAILED DESCRIPTION OF THE PREFERRED EMBODIMENT

Figure 1:
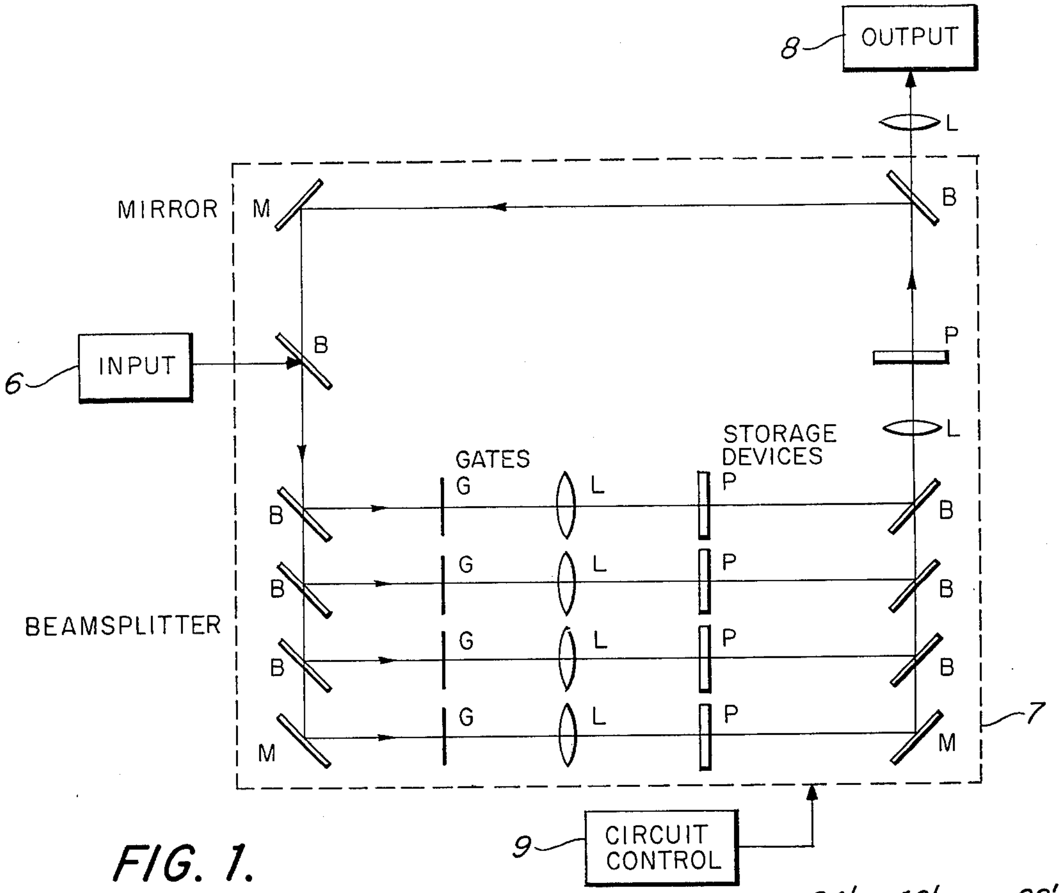
FIG. 1 is a schematic overall arrangement for a parallel optical digital processing system according to the preferred embodiment of the present invention.

To assist in understanding the invention, FIG. 1 illustrates in highly simplified schematic form, a parallel optical digital processing system (PODP) in accordance with a presently preferred embodiment. The overall system includes four basic subsystems; an input 6, an optical circuit 7, an output 8 and a circuit control 9. The input 6 comprises appropriate and generally conventional structure for presenting digital input data to the circuit 7 to be processed therein. Conveniently, this input may include means for illuminating one or more transparencies upon which the digital information to be processed is contained such as by a two-dimensional array of light and dark areas. Alternatively, or additionally, the input could also comprise many other types of systems that are well known in the art such as cathode ray tubes, light source arrays and a variety of other incoherent imaging devices. Furthermore, in image processing applications, the input 6 will additionally include suitable structure for binarizing the image prior to its being directed into the circuit. For example, it may comprise some suitable thresholding structure for assigning all portions of the image above a certain intensity a value of binary one and all areas of the image below that intensity a value of binary zero. Specific structures for doing this do not form part of the present invention and need not be detailed here but several techniques, for example, litho films, are known in the prior art.

The optical circuit 7 is basically made up of a plurality of electro-optic storage devices P (only five being illustrated) coupled together into a circuit by a variety of conventional optical circuit components such as mirrors M, beam splitters B, gates G and lenses or lens systems L to enable data bearing radiation to be transmitted along various paths to be processed in a desired manner under control of a control subsystem schematically illustrated at 9. Specifically, in FIG. 1, the gates G might comprise some form of mechanical or electronic device capable of being controlled to selectively pass or block light but preferably they are merely switches to turn the read-out light sources associated with each storage device on or off at selected times as will be explained hereinafter. The circuit may also include a variety of other components as needed to process the input data in a desired manner as will also become clear hereinafter.

The output subsystem 8 for receiving the digital information that is ultimately processed by the circuit may conveniently consist of suitable photodetectors capable of receiving the output images and may also include an appropriate storage medium for storage and reproduction of the output data.

The circuit illustrated in FIG. 1 is included only to provide a general overall understanding of the invention and it may obviously take other more detailed forms. For example, the input 11 will generally include a plurality of separate input devices capable of reading data into the circuit serially or simultaneously and at one or several positions in the circuit. Furthermore, the circuit itself can be provided with as many loops and storage devices as desired or needed for specific applications.

By proper use of the circuit broadly illustrated in FIG. 1, the basic logical operations of ANDing, ORing, shifting and inverting can be performed on digital data applied to it, and since all Boolean algebra is based on these operations, essentially any type of data processing operation can readily be performed. Prior to describing some of these operations in detail, however, it is believed that it would be helpful to first briefly describe some of the important characteristics of the preferred electro-optic photosensitive devices employed in the invention and how they may be effectively utilized to process input digital data.

In general, an effective parallel digital processor requires active storage elements having the following combination of characteristics: (1) memory—for storage of data arrays; (2) high resolution—to allow large data packing densities; (3) erasability and long recyclability; (4) feed back capabilities— to enable the readout from one element to be read back into itself or into another element; (5) high operational speed; (6) thresholding capabilities—for rebinarization of data arrays after successive operations; and, (7) inversion—to invert the sense of a data array on demand.

There are several types of devices available in the prior art which exhibit these properties in varying degrees including ferro-electric photoconductors, liquid crystals and the like. The device which is most preferred at this time, however, as best exhibiting these characteristics is an electro-optic photosensitive device described in U.S. Pat. No. 3,517,206 to D. S. Oliver, which exhibits persistent internal polarization and which has its conductance varied as a function of the radiation incident upon it and its birefringence varied as a function of the electric field applied across it. It should be well understood at this point, however, that it is not intended to limit this invention to the use of this particular device, and when and if even more suitable active storage devices are developed in the future, these may readily be applicable to the present parallel digital processing system. It should also be emphasized that it is not intended to limit the invention to the use of electro-optic storage devices. It is also quite possible that other types of storage devices such as thermoplastic materials responsive to light could also be developed to a point where they would effectively exhibit the above characteristics and in certain applications, photographic films might be adequately employed.

To assist in a better understanding of the invention, it is believed that a brief description of the preferred storage devices would be helpful and reference is made to FIGS. 2-6.

Figures 2, 3, 4:
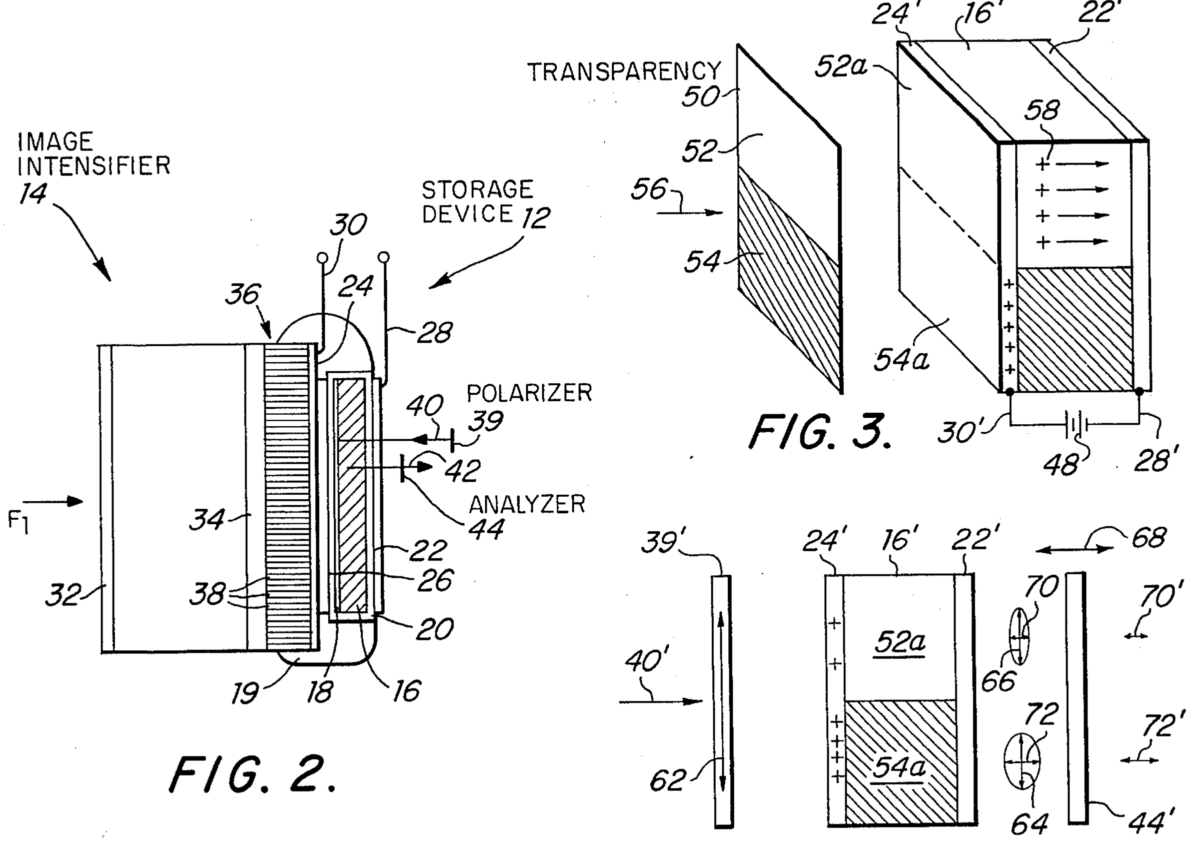
FIGS. 2 through 5 are schematic diagrams provided to explain many of the characteristics and capabilities of the electro-optic photosensitive storage devices used in connection with the presently preferred embodiment of the invention.

In FIG. 2 is illustrated an electro-optic photosensitive device 12 mated with a frequency converter or image intensifier 14. In the presently preferred embodiment, the electro-optic photosensitive device 12 includes a wafer 16 of $Bi_{12}SiO_{20}$ which exhibits the characteristic of induced birefringence and the characteristic of photosensitivity. Specifically, wafer 16 may have its conductance varied as a function of the radiation incident upon it and its birefringence varied as a function of the electric field applied across it. Wafer 16 is contained together with a dichroic reflector 18 in a Parylene insulating layer 20. Transparent electrodes 22 and 24 are coated onto both faces of insulating layer 20 while electrical leads 28 and 30 are connected to electrodes 22 and 24, respectively.

In operation, when an image is imposed onto the electro-optic photosensitive device 12 the photosensitivity of wafer 16 causes its conductance to vary as a function of the intensity of the incident radiation. Thus, each descrete bit of an image impinging upon the wafer 16 will cause the conductance of the wafer at that corresponding portion to vary more or less depending on whether that bit is of higher intensity or lower intensity, respectively. When the intensity is low, that portion of wafer 16 will have its conductance increased only slightly so the field across it imposed by electrodes 22 and 24 will be decreased only slightly. In areas of wafer 16 struck by higher intensity radiation, the conductance will increase to a much greater degree and so the field across it imposed by electrodes 22 and 24 will decrease much more substantially. If the electric field applied across wafer 16 is positive so that an increase in that field increases the induced birefringence of wafer 16, the areas of wafer 16 struck by higher intensity radiation will exhibit less birefringence than those areas struck by low intensity radiation.

Readout is accomplished by directing a beam of polarized radiation 40 into device 12 so that it passes through wafer 16, reflects off of dichroic reflector 18 and returns as beam 42. Beam 40 may be derived from a polarized light source or from an unpolarized light source in conjunction with a polarizer 39. Beam 40 having a specific polarization before its entrance into wafer 16 will have that polarization changed in accordance with the birefringence of the portion of wafer 16 through which it passes. In this example the portions struck by higher intensity radiation will rotate the plane of polarization only slightly, while those struck by low intensity radiation will rotate the plane of polarization to a much more substantial degree. An analyzer 44 placed in output beam 42 may be oriented to select any desired degree of polarization in return beam 42 to discriminate between any two levels of image intensity incident on wafer 16. Thus, if analyzer 44 has its polarization plane oriented substantially the same as the polarization plane of beam 40, analyzer 44 selects only the radiation returning from the high intensity portions and little or none of the radiation coming from the low intensity portions. Conversely, if analyzer 44 were aligned with its polarization plane orthogonal to that of the polarization plane of beam 40, the output from the low intensity portions would be preferred to that from the high intensity areas. In a similar manner any particular intensity level may be chosen as the threshold level by the selection of the orientation of the analyzer and the output beam.

Erasure of the data stored in the device may be accomplished simply by flooding it with illumination to which the device is sensitive, as, for example, with a strobe lamp.

When utilizing the electro-optic photosensitive storage device illustrated in FIG. 2, an image is preferably read into the wafer with blue light to which the device is most sensitive. Readout, on the other hand, is preferably done with red light so that the stored image will not be destroyed by the readout light. Accordingly, to enable the output of one device to be read into another device, and to enable feedback, it is necessary to provide a frequency converter or image intensifier in conjunction with the storage device 12. Such a device is illustrated at 14 in FIG. 2 and has the function of taking longer wavelength red light and converting it to a shorter wavelength blue light for receipt by the device 12. Specifically, the image intensifier 14 includes a photocathode 32 sensitive to red light (e.g. a trialkali compound) to excite a phosphor layer 34 which produces blue light. The radiation from phosphor layer 34 is communicated to wafer 16 via a fiber optic face plate 36 composed of a multiplicity of fiber optic rods 38. Each rod 38 will transmit an approximately focused substantially distortion free image of one or more bits of data to the wafer 14.

Inasmuch as the image intensifier is utilized to enable the output of one device to be read into another or for feedback, it is not essential that every storage device P in FIG. 1 have one associated with it. Furthermore, by strategically positioning the image intensifiers in the circuit, it is possible to utilize one intensifier to transmit images to a plurality of storage devices. In FIG. 2, however, the image intensifier 14 is shown to be physically mated to storage device 12 by means of a rubber sleeve 19 and an oil interface 26.

The actual mode of operation of the electro-optic photosensitive device 12 will now be explained with reference to FIGS. 3 and 4 where like parts have been given like numbers primed with respect to FIG. 2. In FIG. 3 a transparency 50 is provided which carries a simple image in which the upper part 52 is transparent and the lower part 54 is minimally transparent. Transparency 50 is illuminated by a beam 56 of radiation in the range of wavelength to which wafer 16' is sensitive (i.e. such that an image intensifier is not needed). After passing through transparency 50 the radiation 56 striking the upper part **52*a* of wafer 16' has greater intensity than that striking the lower part 54*a*. As a result, upper part 52*a* experiences a greater increase in conductance than does lower part 54*a*. Thus, the positive charges 58, present as a result of the field across wafer 16' produced by battery 48 connected to leads 28' and 30', migrate more easily in upper part 52*a* from electrode 24' to electrode 22' than do positive charges 60 proximate the lower part 54*a* of wafer 16'. Consequently, the electric field across upper portion 52*a* of wafer 16' will be considerably reduced relative to the electric field across lower part 54*a*. Assuming then that the induced birefringence characteristic of wafer 16' is such that the birefringence increases with increase in the voltage across wafer 16', it follows that lower half 54*a* has a greater induced birefringence than upper half 52*a*.**

Now looking at FIG. 4, the information image thus stored in wafer 16' between electrodes 22' and 24' is read out using radiation 40' polarized as indicated by arrow 62 by polarizer 39'. The polarized radiation transmitted through lower half **54*a* of wafer 16' becomes substantially elliptically polarized as indicated by ellipse 64, whereas radiation passing through upper half 52*a* becomes only slightly elliptically polarized as indicated by ellipse 66.**

Analyzer 44' has its plane of polarization oriented as indicated by arrow 68 orthogonal to that of polarizer 39' indicated by arrow 62. Since the component 70 of ellipse 66 parallel to the plane of polarization indicated by arrow 68 is much smaller than the corresponding component 72 of ellipse 64, the output from crossed analyzer 44′ will be much larger in the area corresponding to portion 54*a* of wafer 16′ than in the area corresponding to portion 52*a* as indicated by arrows 72′ and 70′, respectively. Thus, it can be considered that the apparatus of FIG. 4 produces a negative of the information image contained on transparency 50 of FIG. 3. A positive of that image could be provided by the apparatus of FIG. 4 by simply rotating analyzer 44′ 90° so that its plane of polarization is parallel to that of polarizer 39′ as indicated by arrow 62. Further more, thresholding (binarizing) between different levels of image intensity may be readily accomplished by adjusting the orientation of the plane of polarization of the analyzer to selectively transmit components of radiation produced by a particular level of induced birefringence and blocking the others. Thresholding can also be accomplished cyclically varying the voltage across wafer 16′ by means of battery 48.

Further capabilities of the electro-optic photosensitive device 12 are shown in FIGS. 5A-5E wherein like parts have been given like reference numbers primed and double primed with respect to FIGS. 2–4. Initially, in FIG. 5A, battery 48 produces an electric field between electrodes 22′ and 24′ as indicated by curve 80. Electrode 24′ carries a positive charge and electrode 22′ carries a negative charge. The electric field across layer 20′ between electrode 24′ and wafer 16′ and between electrode 22′ and wafer 16′, as indicated by segments 82 and 84, respectively, of curve 80, is small in comparison to the field depicted by segment 86 across wafer 16′ whose dark resistance is extremely high compared to the resistance of layer 20′.

Figure 5A:
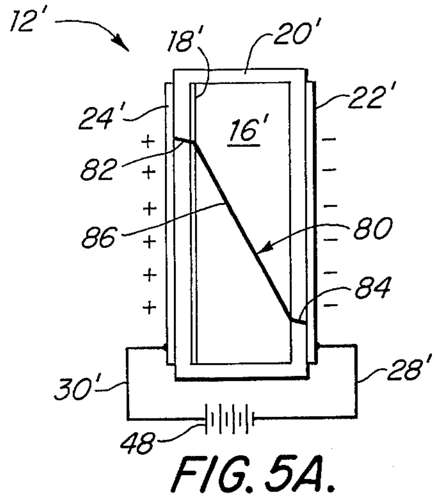
Figure 5B:
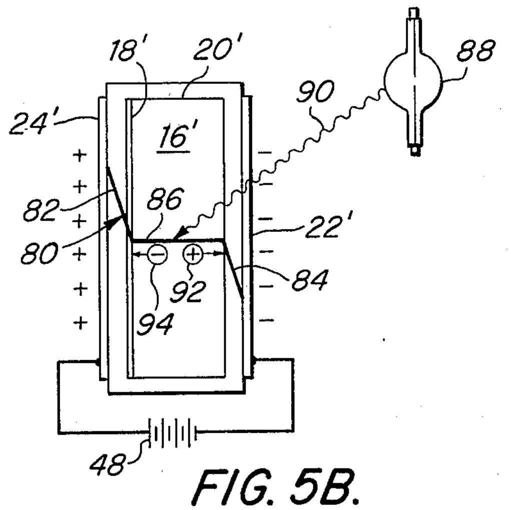

Following this, FIG. 5B, there is a high intensity uniform illumination of wafer 16′ using radiation to which wafer 16′ is extremely sensitive such as that produced by a Xenon flash lamp 88. The radiation 90 from erase light 88 causes wafer 16′ to become highly conductive over its entire area so that the positive and negative charges are free to migrate in wafer 16′. As a result the positive charges 92 migrate toward electrode 22′ which is negatively charged and the negative charges 94 migrate toward electrode 24′ which is positively charged. This reduces the resistance of wafer 16′ to substantially zero which in turn results in a substantially zero field across wafer 16′ as indicated by segment 86 of curve 80: the field provided by battery 48 is now substantially entirely in layer 20′ as indicated by segments 82 and 84 of curve 80. By this technique, erasure of data stored in the wafer may also readily be accomplished.

Figure 5C:
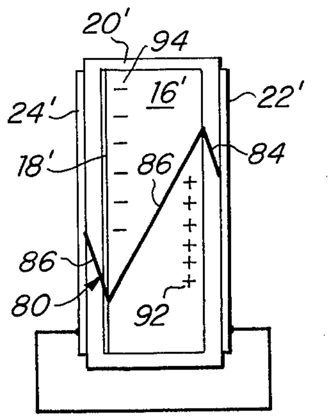

Electrodes 22′ and 24′ are now shorted together, FIG. 5C, by the control system 9 (FIG. 1) eliminating the external charge on the electrodes and leaving only the internal charge in wafer 16′ maintained by the negative charges 94 and positive charges 92. This results in a high electric field across wafer 16′, as indicated by segment 86 of curve 80, which has the opposite polarity to that established by battery 48 in FIG. 5A. The sum of the electric fields across layer 20′ indicated by segments 84 and 86 are equal and opposite to the field across wafer 16′: electrodes 22′ and 24′ are at the same voltage.

Figure 5D:
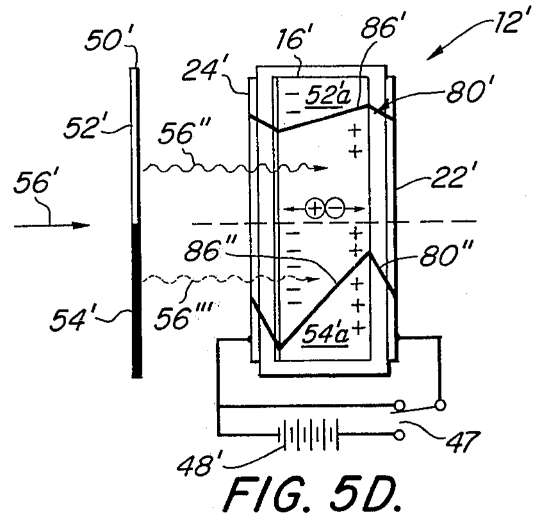

An information image such as that appeariang on transparency 50′, FIG. 5D, may then by presented to electro-optic photosensitive device 12 by exposing wafer 16′ to radiation 56′, such as blue light, to which wafer 16′ is photosensitive, through transparency 50′ having a transparent upper portion 52′ and an opaque or nearly opaque lower portion 54′. The higher intensity radiation 56″ transmitted by transparent portion 52′ causes the upper portion 52*a*′ of wafer 16′ to become highly conductive so that the field across wafer 16′, depicted by segment 86′ of curve 80′, is substantially reduced, whereas the weaker radiation 56‴ transmitted by the lower portion 54′ of transparency 50′ increases the conductance of lower portion 54*a*′ of wafer 16′ relatively little so that the field across portion 54*a*′, depicted by segment 86″ of curve 80″, is practically unchanged, If, now, an external voltage equal but opposite to the original applied voltage is applied to electrodes 22′ and 24′ such as by means of battery 48′ and switch 47 the high field condition across portion 54*a*′ is essentially neutralized, whereas the reduced electric field across portion 52*a*′ is easily overcome and a reverse field established. In this manner a logical inversion of the information present in wafer 16′ may be accomplished by merely switching the polarity of the applied voltage which capability is important in data processing operations as will be explained hereinafter.

Figure 5E:
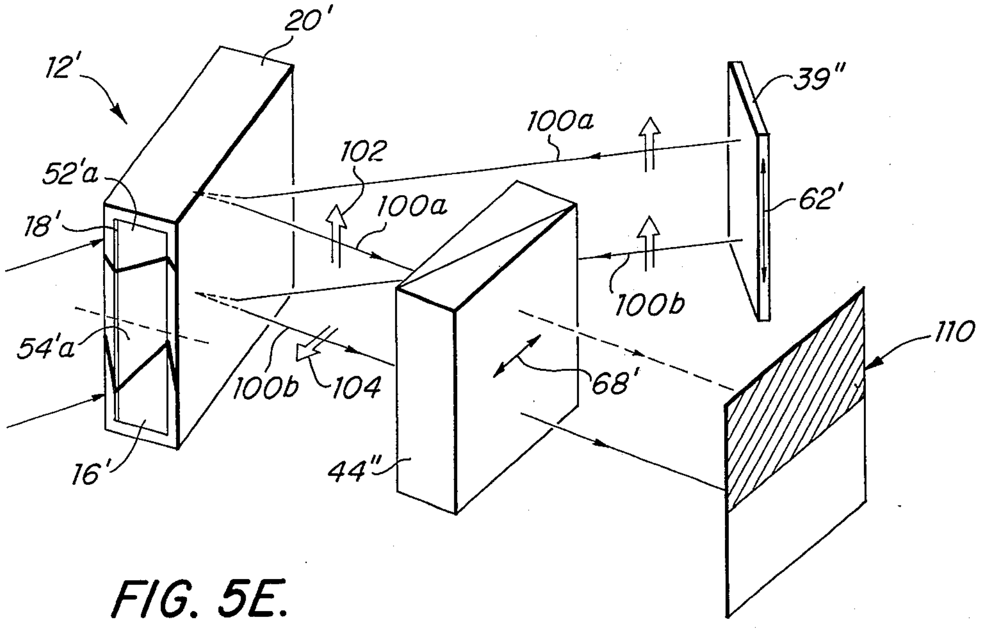

Readout of the information stored in wafer 16′ may be accomplished using radiation 100a, 100b, FIG. 5E, which is vertically polarized, as indicated by arrow 62′, by polarizer 39″. Radiation 100*a* and 100*b* passes through wafer 16′, reflects off dichroic reflector 18′ and is retransmitted through wafer 16′ to analyzer 44″. Since the electric field in upper portion 52a′ of wafer 16′ is relatively low, the induced birefringence in portion 52*a*′ is minimal so that the radiation 100*a* upon being retransmitted from wafer 16′ has substantially the same vertical polarization, as indicated by arrow 102, as originally established by polarizer 39″. In contrast since lower portion 54a′ has a relatively high electric field, the induced birefringence in portion 54*a*′ will be substantial. Therefore, radiation 100*b* retransmitted from portion 54a′ will have its plane of polarization significantly rotated, e.g. so that the plane of polarization is now, as indicated by arrow 104, orthogonal to that of the polarization originally imparted by polarizer 39″. Since analyzer 44″ is a crossed analyzer, i.e. has its plane of polarization orthogonal to that of polarizer 39″ the vertically polarized radiation 100*a* is blocked while the horizontally polarized radiation 100*b* is passed to produce a negative 110 of the image originally supplied by transparency 50′, (i.e. the transparent and opaque areas are reversed).

By setting the analyzer used in the readout operation to selectively transmit radiation of a certain polarization and reject radiation of other polarizations, a distinction can be made between induced birefringence up to a threshold level and the induced birefringence beyond that level which in turn sets up a threshold for recognizing the intensity of the readin radiation below a certain threshold as one class of quantities and intensity above that threshold level as a second class of quantities. In this manner, a binary system can be readily established by arbitrarily assigninng radiation intensities above a certain threshold level with a value of binary one and those below that threshold level with the value of binary zero. This can conveniently be accomplished by using opaque (minimally transparent) areas on a transparency, for example, to designate a zero and transparent areas to designate a one. By properly manipulating one or more arrays of input data utilizing some or all of the components in the optical circuit of FIG. 1, essentially any desired type of logical operation can be performed on the data to permit images to be processed or numerical calculations to be performed. Image inverting has been described above. In the following pages, circuit configurations for ANDing, ORing and shifting, will be described. These are intended to be exemplary only, and many other circuit arrangements for performing the same or other operations will become readily apparent to those skilled in the art.

Figure 6:
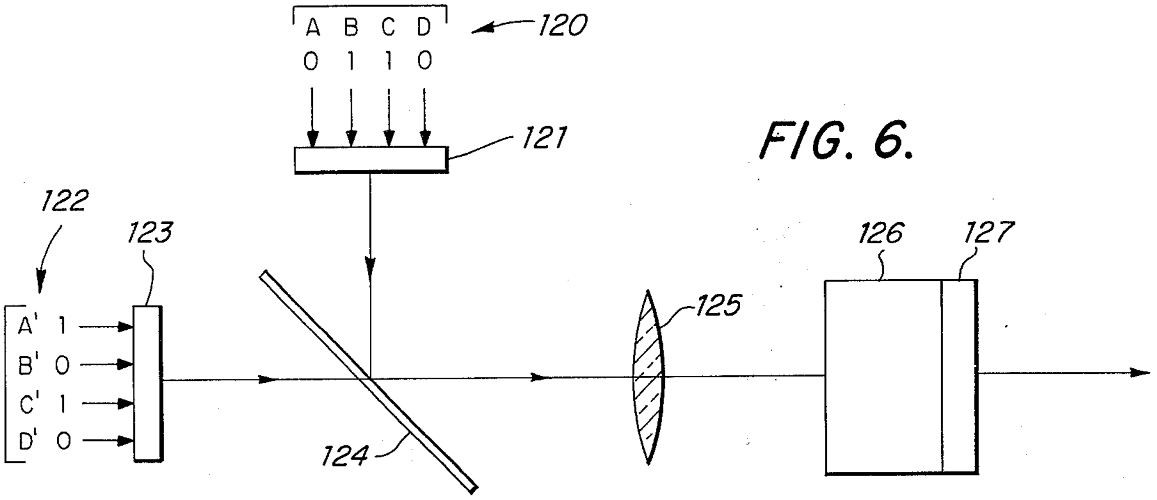
FIG. 6 is a simplified schematic diagram illustrating one possible circuit configuration for obtaining the logical AND or the logical OR of two inputs according to this invention.

FIG. 6 illustrates one possible circuit configuration that can be effectively used to obtain either the logical AND or the logical OR of two inputs 120 and 122. To simplify the explanation, we will assume that input 120 comprises a four bit binary word A, B, C, D having the values 0, 1, 1, 0, respectively (represented as transparent areas for a 1 and dark areas for a 0 on a transparency, for example) while input 122 comprises a four bit binary word A', B', C', D' having the values 1, 0, 1, 0, respectively. As the first processing step for either ANDing or ORing, the two words must be read into optical circuit 7 (FIG. 1). This can conveniently be accomplished by reading them separately into two different electro-optic storage devices 121 and 123 as illustrated (utilizing blue light). Thereafter, to obtain the OR of the two inputs, the following sequence of operations should be performed. (1) The two image arrays are simultaneously read out of storage devices 121 and 123 (utilizing the red light read-out structure described above which structure has not been shown in FIG. 6 for clarity). (2) These two images will be superimposed upon one another and directed by beam splitter 124 through lens 125 and image intensifier 126 to storage device 127. Accordingly, storage device 127 will hold the combined value of images 120 and 122 or 1, 1, 2, 0. (3) The image stored in device 127 is then read out and thresholded (as explained above) by distinguishing between intensities of less than 1 (binary zero) and intensities of 1 or greater (binary one). The output of storage device 127 will, therefore, be 1, 1, 1, 0 which is the logical OR of the two inputs.

To utilize the circuit configuration of FIG. 6 to get the AND of the two inputs 120 and 122 the following sequence should be followed. (1) The images stored in devices 121 and 123 are inverted as illustrated in FIGS. 5A-5E. This produces in the storage devices 121 and 123 the arrays 1, 0, 0, 1 and 0, 1, 0, 1, respectively. (2) These two inverted images are then simultaneously read out, combined, and read into storage device 127 through beam splitter 124, lens 125 and image converter 126. This will place the image 1, 1, 0, 2 in device 127. (3) This stored image is then inverted, thresholded and read out to give the value 0, 0, 1, 0, the logical AND of the two inputs.

Figure 7:
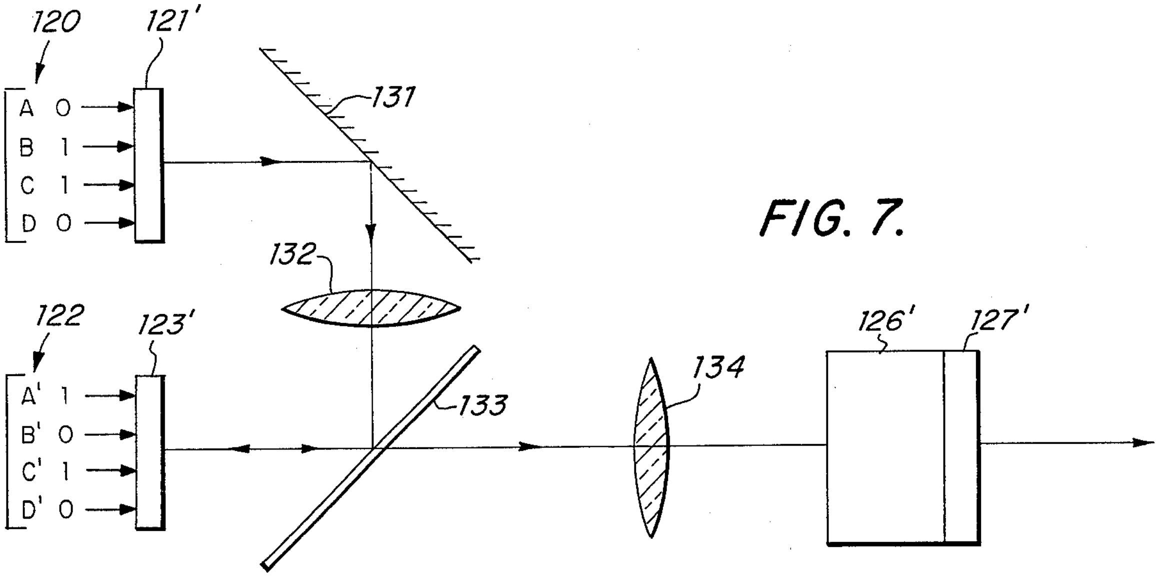
FIG. 7 illustrates an alternative circuit configuration for obtaining the logical AND or the logical OR of two inputs.

FIG. 7 illustrates a second circuit configuration that can also be used to obtain the OR or the AND of two inputs. First, the two inputs 120 and 122 are stored in storage devices 121' and 123', respectively, as before. Thereafter, to obtain the OR of the two inputs the following procedure is carried out. (1) The inputs are first inverted to give the arrays 1, 0, 0, 1 in device 121' and 0, 1, 0, 1 in device 123'. (2) The image in device 121' is then read out and directed to device 123' by means of mirror 131, lens 132, and beam splitter 133 so as to readout the image stored in device 123'. (3) the combined output of devices 121' and 123', essentially the products of the two stored images (0, 0, 0, 1) are then directed through beam splitter 133, lens 134 and image intensifier 126' into storage device 127'. (4) This image is then inverted in device 127' and read out to provide the output 1, 1, 1, 0, the OR of the two inputs.

To obtain the AND of the two inputs utilizing the configuration of FIG. 7, the following steps are carried out. (1) The image in device 121' is read out and directed to device 123' by means of mirror 131, lens 132, and beam splitter 133 in order to read out the image stored in device 123'. (2) The product (0, 0, 1, 0) is then read into device 127' through beam splitter 133, lens 134 and image intensifier 126. (3) This image is then read out of device 127' to provide the AND of the two inputs 0, 0, 1, 0.

Figure 8:
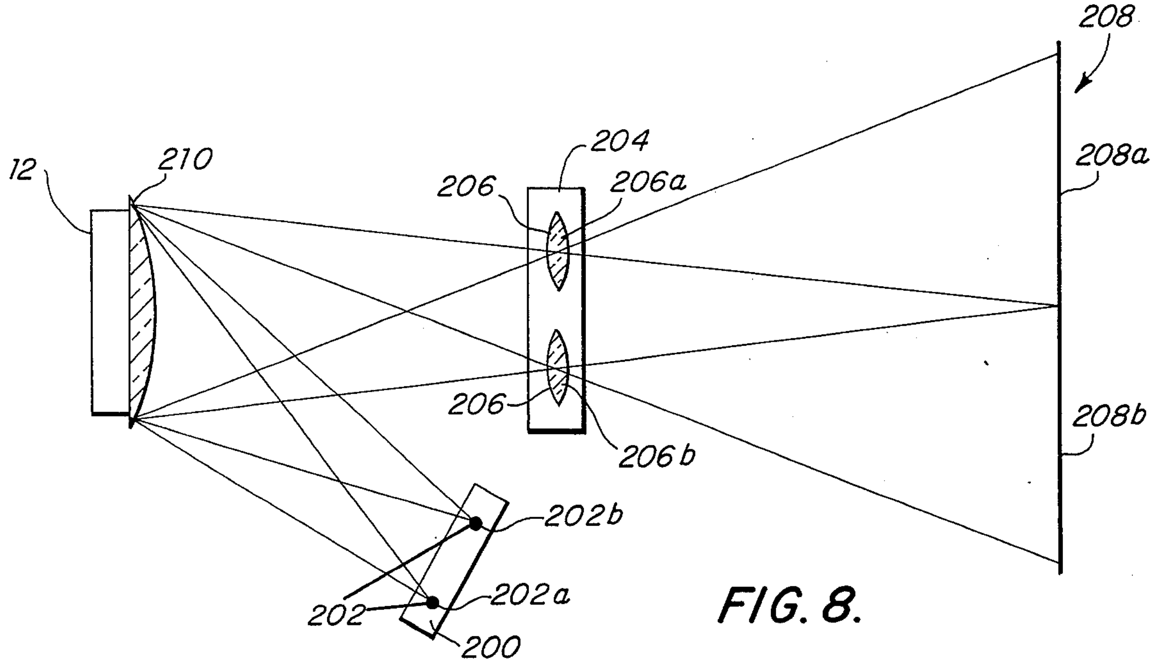
FIG. 8 is a simplified schematic diagram illustrating one type of image shifting structure that may be used in the present invention.

Thus it can be seen that the basic logical functions of inversion, ORing and ANDing can easily be achieved using the parallel optical digital processor of the present invention. Another important logical operation is that of image shifting. This can also be readily accomplished in the present system by using for the readout source of the storage devices a plurality of light sources 202 and a plurality of lenses 206 (FIG. 8). The light sources and lenses are both mounted in a two-dimensional array 200 and 204, respectively, and are aligned with the lens array positioned conjugate to the source array via condenser lens 210 coupled to the storage device 12. With this arrangement, the image readout of storage device 12 may be shifted about to appear in different positions at plane 208 (which may be the image intensifier of another storage device) in accordance with which one of light sources 202 is used to read out the device 12. For example, when light source 202*a*, is energized the image of the information in storage device 12 is projected through condenser lens 210 and conjugate lens 206*a* to appear at position 208*a* in plane 208. When light source 202*b* is energized, on the other hand, the image in device 12 will be transmitted by conjugate lens 206*b* to appear position 208*b* on plane 208. Light sources 202 and lenses 206 are preferably positioned such that the images appearing at plane 208 may be shifted in steps which are equal to the smallest resolvable element usable by the system, i.e. the element representing one binary bit of information. In practice, only selected ones of the storage devices in FIG. 1 need be provided with this shifting structure. It should also be understood that other shifting structures such as mirrors or the like could also be used if desired and the specific shifting structures described do not form part of this invention but are described in U.S. Patent application Ser. No. 426,992 of Alan J. MacGovern filed on Dec. 20, 1973. As is well understood by those skilled in the art, however, the ability to shift data arrays relative to one another and relative to itself is a necessary tool in performing and simplifying many types of processing operations and computations.

Thus, it is evident that by proper control over the parallel optical digital processing system of the present invention all of the basic logical operations of ANDing, ORing, inverting and shifting can readily be accomplished. Since all Boolean albegra is based upon these four basic operations, it should therefore by apparent that the present invention can be utilized to perform essentially any type of standard image processing operation or other form of logical data manipulation. By expanding the circuit of FIG. 1 such that the result of one of the operations illustrated in FIGS. 5–8 is used as the input for subsequent operations, a whole series of steps can readily be performed to enable the necessary processing to be carried out. Inasmuch as these subsequent operations will be similar to those described albeit employing different input data, and inasmuch as the sequence of operations to be followed for specific applications are known by those skilled in the art, no useful purpose would be served by going into detail with respect to some of these operations. Suffice it to say, however, that with the present invention a highly versatile general purpose system is provided that can perform essentially any desired type of processing operation. With certain additions, the system can also be adapted to perform numerical calculations.

Although, with the present invention, each individual data manipulation is relatively slow as compared to the speeds obtainable by digital computers, this is more than made up for by the fact that the present system operates on the data in parallel and may, therefore, perform thousands or even millions of data manipulations simultaneously. Furthermore, in the present invention the two-dimensional image arrays retain their basic identity throughout the processing operation and are not converted into electrical or other types of signals to be processed. This makes the system especially suitable for image processing. Also, by employing the preferred electro-optic photosensitive storage devices described herein substantial resolution is obtainable. Specifically, these storage devices can effectively provide a resolution of 20–25 lines per millimeter when used in conjunction with an image intensifier. Thus, a device 40 by 40 millimeters in size will have a storage capability of well in excess of one-half million data elements. In applications wherein the image intensifiers are not needed, substantially greater resolution of perhaps 100 lines per millimeter or more is readily obtainable. If desired, storage ability can be further increased by simply employing several storage devices mounted in a matrix. The system can also operate at a speed of 30 cycles per second or greater to thereby enable many millions of resolution points per second to be processed. Finally, with this system, additional speed may be obtained by performing several processing operations simultaneously utilizing different branches of the circuit.

What has been described is a presently preferred embodiment of the invention. It should be understood, however, that the invention may also take many other forms as recognized by those skilled in the art. For example, many other circuit configurations for ANDing, ORing and the like should be apparent. Also, additional structures may be included in the circuit of FIG. 1 for specialized applications. Accordingly, it should be understood that the invention should be limited only as required by the scope of the following claims.

What is claimed is:

1. Apparatus for processing digital data in parallel comprising:

a. an optical digital data processing circuit, said circuit including:

1. a plurality of erasable digital data storage means, each of said digital data storage means including means responsive to digital data bearing radiation for reading in and storing a two-dimensional array of digital data presented thereto:
2. means associated with each of said plurality of digital data storage means for reading out a two-dimensional array of digital data therefrom, said readout means including means for producing radiation bearing said two-dimensional array of sigital data read out therefrom; and,
3. coupling means for coupling said plurality of digital data storage means together into said circuit, said coupling means including means for optically transmitting radiation bearing two-dimensional arrays of digital data among said plurality of digital data storage means;

b. control means coupled to said circuit for directing digital data bearing radiation through said circuit in a prescribed manner to process the two-dimensional arrays of digital data carried thereby;

c. means for inputting digital data to be processed into said circuit; and, d. means for outputting processed digital data from said circuit.

2. Apparatus as recited in claim 1 wherein at least some of said digital data storage means further include means associated therewith for inverting the sense of an array of digital data stored therein.

3. Apparatus as recited in claim 2 wherein at least some of said digital data storage means further include means associated therewith for laterally shifting an array of digital data stored therein.

4. Apparatus as recited in claim 3 wherein at least some of said digital data storage menas further include means associated therewith for thresholding an array of digital data stored therein, said thresholding means including means for setting a threshold level for distinguishing between digital data in said array having values above and below said threshold level.

5. Apparatus as recited in claim 1 wherein said coupling means includes means for optically transmitting radiation bearing an array of digital data read out of one of said digital data storage means to another of said digital data storage means to read in and store said array of digital data in said other digital data storage means.

6. Apparatus as recited in claim 1 wherein said coupling means includes means for combining radiation bearing first and second arrays of digital data read out of first and second digital data storage means, respectively, and for transmitting radiation bearing said combined array of digital data to a third digital data storage means to read in and store said combined array of digital data in said third digital data storage means.

7. Apparatus as recited in claim 6 wherein said combining means comprises beamsplitter means.

8. Apparatus as recited in claim 6 wherein said combining means comprises means for adding said first and second arrays of digital data.

9. Apparatus as recited in claim 6 wherein said combining means comprises means for multiplying said first and second arrays of digital data.

10. Apparatus as recited in claim 1 wherein said radiation comprises incoherent radiation.

11. Apparatus as recited in claim 1 wherein each of said digital data storage means comprises an electro-optic photosensitive device.

12. Apparatus as recited in claim 11 wherein each of said electro-optic photosensitive devices have a photosensitive characteristic in which the conductance of said device varies as a function of the intensity of the radiation presented thereto, and an electro-optic birefringent characteristic in which the birefringence varies as a function of an applied electric field, and wherein each of said devices includes means for applying an electric field thereto.

13. Apparatus as recited in claim 12 wherein said readout means comprises means associated with each of said electro-optic photosensitive devices for exposing said devices to polarized radiation to read out an array of digital data stored therein.

14. Apparatus as recited in claim 14 and further including analyzer means for receiving said polarized radiation and for selectively transmitting radiation having a predetermined polarization to threshold the array of digital data read out therefrom.

15. Apparatus as recited in claim 13 wherein the radiation employed to read in an array of digital data into each of said devices and the polarized radiation to read out an array of digital data from each of said devices comprise radiation of first and second wavelengths respectively.

16. Apparatus as recited in claim 15 wherein at least some of said devices have an image intensifier associated therewith for receiving radiation of said second wavelength and for converting said radiation to said first wavelength for receipt by the device associated therewith.

17. Apparatus as recited in claim 13 wherein said readout means further includes means for laterally shifting the array of digital data read out therefrom.

18. Apparatus as recited in claim 12 wherein each of said electro-optic photosensitive devices have means associated therewith for illuminating said devices with radiation to which the devices are highly sensitive for erasing an array of digital data stored therein.

19. Apparatus as recited in claim 12 wherein said control means includes means coupled to said electric field applying means of each of said devices for reversing the polarity of said electric field to invert the sense of said digital data array stored therein.

20. Apparatus for processing digital data in parallel comprising:

a. an optical digital data processing circuit, said circuit including:
   1. a plurality of electro-optic photosensitive storage devices, each of said devices having a photosensitive characteristic in which the conductance of said device varies as a function of the intensity of the radiation presented thereto, and an electro-optic birefringent characteristic in which the birefringence varies as a function of an applied electric field;
   2. means associated with each of said devices for reading out a two-dimensional array of digital data therefrom, said readout means including means for exposing said devices to polarized radiation; and,
   3. coupling means for coupling said plurality of devices together into said circuit, said coupling means including means for optically transmitting radiation bearing two-dimensional arrays of digital data among said plurality of devices;

b. control means coupled to said circuit for directing digital data bearing radiation through said circuit in a prescribed manner to process the two-dimensional arrays of digital data carried thereby;

c. means for inputting radiation bearing two-dimensional arrays of digital data to be processed into said circuit; and, d. means for outputting radiation bearing processed two-dimensional arrays of digital data from said circuit.

21. Apparatus as recited in claim 20 wherein said radiation comprises incoherent radiation.

22. Apparatus as recited in claim 20 wherein said polarized radiation for reading out said devices is of a different wavelength than the radiation bearing arrays of digital data to be read in and stored in said devices.

* * * * *